(12) United States Patent
Kim

(10) Patent No.: US 9,541,778 B2
(45) Date of Patent: Jan. 10, 2017

(54) AFTERIMAGE CORRECTION IN DISPLAY DEVICE

(71) Applicant: Samsung Display Co., Ltd., Yongin, Gyeonggi-Do (KR)

(72) Inventor: Jong-Hwa Kim, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 13 days.

(21) Appl. No.: 14/745,080

(22) Filed: Jun. 19, 2015

(65) Prior Publication Data

US 2016/0161783 A1 Jun. 9, 2016

(30) Foreign Application Priority Data

Dec. 5, 2014 (KR) .................. 10-2014-0173908

(51) Int. Cl.
*G02F 1/133* (2006.01)
*G02F 1/1335* (2006.01)
*G02B 26/00* (2006.01)

(52) U.S. Cl.
CPC ......... *G02F 1/13318* (2013.01); *G02B 26/005* (2013.01)

(58) Field of Classification Search
CPC .............. G02F 2001/13312; G02F 1/1362; G02F 1/135; G02F 1/13318; G02F 1/136277

USPC .................................................. 349/116, 120
See application file for complete search history.

(56) References Cited

U.S. PATENT DOCUMENTS

| 8,605,157 B2 * | 12/2013 | Kobayashi | G09G 5/10 348/189 |
| 2012/0075286 A1 * | 3/2012 | Shim | G09G 3/003 345/419 |

FOREIGN PATENT DOCUMENTS

| JP | H10214067 A | 8/1998 |
| JP | 2000098389 A | 4/2000 |
| KR | 20120134459 A | 12/2012 |
| KR | 20120139122 A | 12/2012 |
| KR | 20130062613 A | 6/2013 |

* cited by examiner

*Primary Examiner* — Mike Qi
(74) *Attorney, Agent, or Firm* — Innovation Counsel LLP

(57) ABSTRACT

Provided is a display device. The display device includes a display portion configured to display an image, a photo sensor electrically connected to the display portion and configured to facilitate correction of an afterimage of the display portion; and a shutter portion disposed on the display portion and comprising a shutter positioned and configured to selectively block light over an afterimage correction pattern generated by the correction of the afterimage facilitated by the photo sensor, so as to selectively prevent a user from viewing a portion of the display portion upon which the afterimage correction pattern occurs.

6 Claims, 4 Drawing Sheets

AFTERIMAGE CORRECTION IN DISPLAY DEVICE

CROSS-REFERENCE TO RELATED APPLICATIONS

This U.S. non-provisional patent application claims priority under 35 U.S.C. §119 to Korean Patent Application No. 10-2014-0173908 filed on Dec. 5, 2014, the entire contents of which are hereby incorporated by reference.

BACKGROUND

The present disclosure relates generally to flat panel display devices, and more particularly to flat panel display devices capable of correcting afterimages.

A display device performs an afterimage correction process using a photo sensor after being powered off. During such afterimage correction, a user may perceive an undesirable afterimage correction pattern.

SUMMARY

The present disclosure provides a display device capable of reducing or eliminating the perception of afterimage correction patterns.

Issues to be addressed in the present disclosure are not limited to those described above and other issues unmentioned above will be clearly understood by those skilled in the art from the following description.

Embodiments of the inventive concept provide display devices including: a display portion configured to display an image; a photo sensor electrically connected to the display portion and configured to facilitate correction of an afterimage of the display portion; and a shutter portion disposed on the display portion and including a shutter positioned and configured to selectively block light over an afterimage correction pattern generated by the correction of the afterimage facilitated by the photo sensor, so as to selectively prevent a user from viewing a portion of the display portion upon which the afterimage correction pattern occurs.

In some embodiments, the display portion may include an organic light emitting display (OLED).

In other embodiments, the shutter may include an electro wetting display (EWD).

In still other embodiments, the shutter may include a liquid crystal display.

In even other embodiments, the shutter may substantially entirely cover the display portion.

In yet other embodiments, the shutter may cover only those parts of the display portion on which the photo sensor is disposed.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3A and FIG. 33 are cross-sectional views illustrating further details of a shutter portion of a display device according to an embodiment of the inventive concept.

Figure 1A:
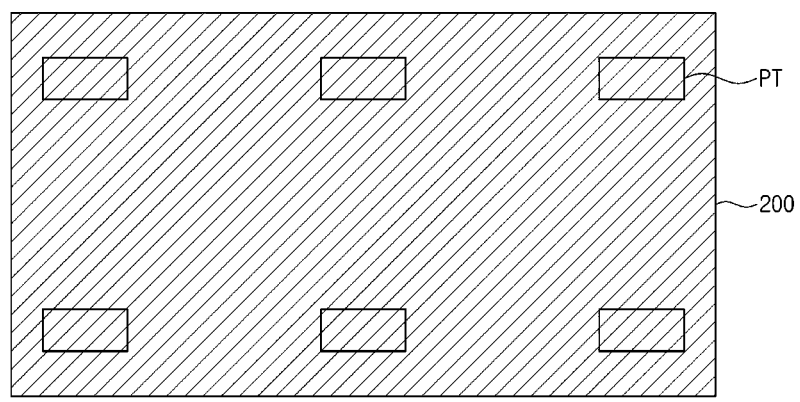
FIG. 1A is a plan view of a front surface of a display device according to an embodiment of the inventive concept.

The various Figures are not to scale.

DETAILED DESCRIPTION OF THE EMBODIMENTS

Objects, other objects, features and advantages of the present disclosure will become more easily understood to those of ordinary skill in the art with the following detailed description and accompanying drawings. The inventive concepts may, however, be embodied in different forms and should not be construed as limited to the embodiments set forth herein. Rather, these embodiments are provided so that this disclosure will be thorough and complete, and will fully convey the scope of the inventive concept to those skilled in the art. The different features of the various embodiments, disclosed or otherwise understood, can be mixed and matched in any manner to produce further embodiments within the scope of the invention.

It will be understood that when an element is referred to as being "on" another element, it can be directly on the other element or intervening elements may also be present. In addition, in the drawings, the thicknesses of elements are exaggerated for effective explanation.

Example embodiments are described herein with reference to cross-sectional views and/or plan views that are schematic illustrations of example embodiments. In the drawings, the thicknesses of layers and regions are exaggerated for clarity. As such, variations from the shapes of the illustrations as a result, for example, of manufacturing techniques and/or tolerances, are to be expected. Thus, example embodiments should not be construed as limited to the particular shapes of regions illustrated herein but may be to include deviations in shapes that result, for example, from manufacturing. For example, an implanted region illustrated as a rectangle may, typically, have rounded or curved features. Thus, the regions illustrated in the figures are schematic in nature and their shapes may be not intended to illustrate the actual shape of a region of a device and are not intended to limit the scope of example embodiments. It will be understood that although the terms "first", "second", etc. may be used herein to describe various components, these components should not be limited by these terms. These terms are only used to distinguish one element from another element. An embodiment described and exemplified herein includes a complementary embodiment thereof.

The terms and words used in the following description and claims are to describe embodiments but are not limited the inventive concept. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

Hereinafter, specific embodiments will be described in detail with reference to the accompanying drawings.

Figure 1B:
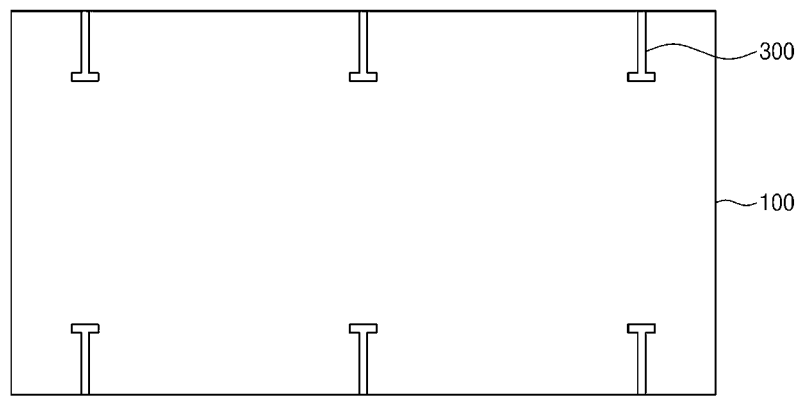
FIG. 1B is a plan view of a rear surface of the display device of FIG. 1A.
Figure 2:
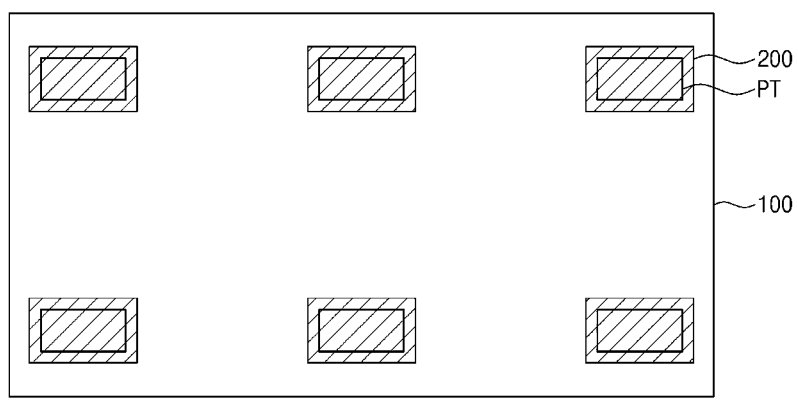
FIG. 2 is a plan view illustrating a display device according to another embodiment of the inventive concept.
Figure 3A:
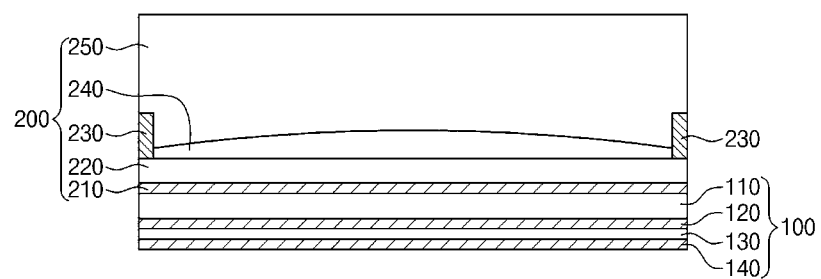
Figure 3B:
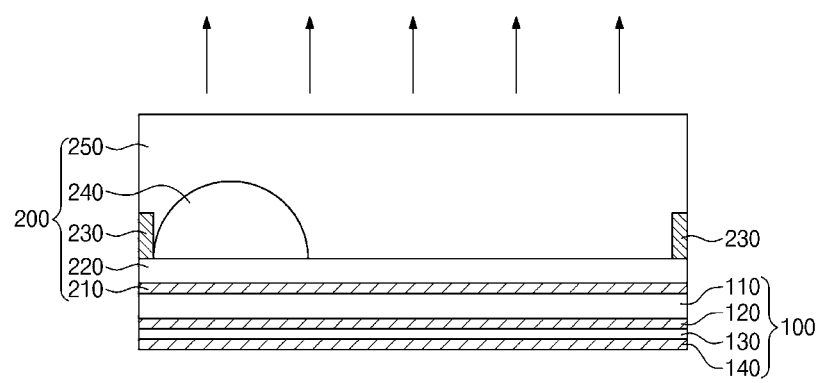

FIG. 1A is a plan view illustrating front surface of a display device according to an embodiment of the inventive concept, and FIG. 1B is a plan view illustrating rear surface of the display device of FIG. 1A. FIG. 2 is a plan view illustrating a display device according to another embodiment of the inventive concept. FIG. 3A and FIG. 3B are cross-sectional views illustrating details of a shutter portion of a display device according to an embodiment of the inventive concept.

Referring to FIG. 1A, FIG. 1B, FIG. 2, FIG. 3A and FIG. 3B, a display device includes a display portion 100, photo sensors 300, and a shutter portion 200.

The display portion 100 includes a substrate 110, first and second electrodes 120 and 140 disposed facing and separate from each other on the substrate 110, and an organic light emitting layer 130 disposed between the first and second electrodes 120 and 140. In the present embodiment, the display portion 100 is exemplarily described as, but is not limited to, an organic light emitting diode (OLED).

The substrate 110 may include, but is not limited to, glass, a transparent plastic, or quartz.

The first electrode 120 is disposed on a first surface of the substrate 110 and may be a pixel electrode or a positive electrode. As an example, the first electrode 120 may be a transmissive electrode. The first electrode 120 may be formed of a transparent metal oxide, for example, indium tin oxide (ITO), indium zinc oxide (IZO), zinc oxide (ZnO), indium tin zinc oxide (ITZO), etc. As another example, the first electrode 120 may be a semi-transmissive electrode or a reflective electrode.

The second electrode 140 is separated from the first electrode 120 and may be a common electrode or a negative electrode. As an example, the second electrode 140 may include Li, Ca, LiF/Ca, LiF/Al, Al, Mg, Ag, or a compound or a mixture (e.g., a mixture of Ag and Mg) thereof. As another example, the second electrode 140 may include a transparent conductive film formed of ITO, IZO, ZnO, ITZO, etc.

Electrons and holes from the first and second electrodes 120 and 140 are combined to generate excitons in the organic light emitting layer 130 and the excitons emit light through stabilization (losing energy). Hole transport materials may be further included between the first electrode 120 and the organic light emitting layer 130 and electron transport materials may be further included between the second electrode 140 and the organic light emitting layer 130.

When the display device is powered off, the photo sensors 300 perform a function of COM an afterimage on the display portion 100. In FIG. 1B, 6 photo sensors that are spaced apart from each other along opposing edges of the display device. However, the number and disposition of the photo sensors 300 are not limited hereto. Any number of photo sensors 300 is contemplated, where these photo sensors 300 can be positioned at any locations on the display portion 100.

In the present embodiment, the photo sensors 300 are electrically connected to the display portion 100. As an example, the photo sensors 300 may be disposed on the bottom surface of the display portion 100, namely, on the second electrode 140. While the photo sensors 300 correct the afterimage of the display portion 100, as illustrated in FIGS. 1A and 1B, afterimage correction patterns PT are formed on the top surface of the display device. These afterimage correction patterns PT would ordinarily be perceptible by a user. Accordingly, to prevent the user from seeing these afterimage correction patterns PT, in embodiments of the inventive concept, the shutter portion 200 is disposed on the display portion 100.

The shutter portion 200 may cover the afterimage correction patterns PT on the display portion 100. According to an embodiment of the inventive concept, the shutter portion 200 includes an electro wetting display (EWD), although any display type is contemplated.

The EWD 200 according to an embodiment of FIG. 1 entirely covers the display portion 100 and is disposed on the display portion 100 (i.e. positioned between the display portion 100 and a user/viewer of the display device). Alternatively, an EWD 200 according to another embodiment of FIG. 2 may be disposed to selectively cover the afterimage correction patterns on the display portion 100.

In FIGS. 3A and 3B, the EWD 200 may include an EWD electrode 210 disposed on the substrate 110 of the display portion 100, a hydrophobic organic film 220 disposed on the EWD electrode 210, partitions 230 disposed on the hydrophobic organic film 220, black oil 240 in a space formed by the partitions 230, and water 250 filling the inside of the EWD 200 on the black oil 240. The space outlined by the partitions 230 may correspond to pixel areas of the display portion 100.

The EWD 200 uses the principle that the water 250 does not mix with the black oil 240. As illustrated in FIG. 3A, when a voltage is not applied to the EWD electrode 210, the black oil 240 covers substantially the entire hydrophobic organic film 220 so that all a user perceives is a black color. On the contrary, as illustrated in FIG. 3B, when a voltage is applied to the EWD electrode 210, the black oil 240 accumulates over only a part of the hydrophobic organic film 220 leaving the rest of organic film 220 to pass light, i.e. an image, from display portion 100.

During the time when the display device is powered off and the photo sensors 300 operate to correct for afterimages, when a voltage is not applied to the EWD electrode 210 of the shutter portion 200, the shutter portion 200 may be in a black state, i.e. may block light so that users see only black. Accordingly, the user may not perceive the afterimage correction patterns PT.

Figure 4A:
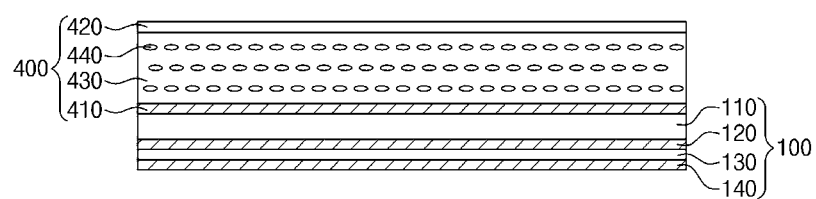
FIG. 4A and FIG. 4B are cross-sectional views illustrating further details of a shutter portion of a display device according to another embodiment of the inventive concept.
Figure 4B:
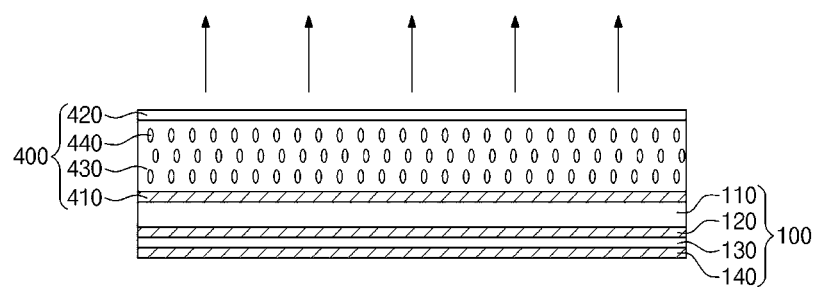

FIGS. 4A and 4B are cross-sectional views for explaining a shutter portion of a display device according to another embodiment of the inventive concept. FIGS. 4A and 4B are cross-sectional views of an alternate construction of the display panel of FIGS. 1A and 1B.

Referring to FIGS. 4A and 4B, the display device includes a display portion 100, photo sensors 300, and a shutter portion 400.

The display portion 100 includes a substrate 110, first and second electrodes 120 and 140 disposed facing and separate from each other on the substrate 110, and an organic light emitting layer 130 disposed between the first and second electrodes 120 and 140.

The shutter portion 400 is disposed on the substrate 110 of the display portion 100, In the present embodiment, the shutter portion 400 includes a liquid crystal display (LCD) although, as above, any other display type is contemplated.

Although FIGS. 4A and 4B show LCD 400 entirely or substantially entirely covering the display portion 100, the LCD 400 may be disposed to cover less than the entirety of display portion 100, such as only a portion in which afterimage correction patterns PT appear on the substrate 110 of the display portion 100.

The LCD 400 includes first and second LCD electrodes 410 and 420 disposed facing and separate from each other on the substrate 110 of the display portion 100, and a liquid crystal layer 430 filling the gap between the first and second LCD electrodes 410 and 420. An electric field is formed inside the liquid crystal layer 430 by a difference in voltages applied to the first and second LCD electrodes 410 and 420, and an alignment direction of the liquid crystal molecules 440 inside the liquid crystal layer 430 is thereby changed. The alignment direction of the liquid crystal molecules 440 imparted by this electric field selectively transmits or blocks light as desired. Similar to the embodiment of FIGS. 3A and 3B, on shutdown, the LCD 400 selectively displays a black image over any areas where the undesired visual effects of afterimage correction occur (or over any other areas that may have an undesired visual effect), thus preventing the user from seeing any such undesirable visual effects.

Elements of the display portion 100 and the photo sensors 300 not described in relation to FIGS. 4A and 4B are substantially the same as elements described in relation to FIGS. 1A, 1B, 2, 3A and 3B, and descriptions thereof will be omitted.

According to embodiments of the inventive concept, during correcting of afterimages using photo sensors, undesirable visual effects may be produced. These undesired effects of afterimage correction may be selectively obscured by an additional display panel that acts as a shutter, displaying a black patch over only those areas in which these undesirable visual effects occur.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A display device comprising:
    a display portion configured to display an image;
    a photo sensor electrically connected to the display portion and configured to facilitate correction of an afterimage of the display portion; and
    a shutter portion disposed on the display portion and comprising a shutter positioned and configured to selectively block light over an afterimage correction pattern generated by the correction of the afterimage facilitated by the photo sensor.

2. The display device of claim 1, wherein the display portion comprises an organic light emitting display (OLED).

3. The display device of claim 1, wherein the shutter comprises an electro display (EWD).

4. The display device of claim 1, wherein the shutter comprises a liquid crystal display.

5. The display device of claim 1, wherein the shutter substantially entirely covers the display portion.

6. The display device of claim 1, wherein the shutter covers that part of the display portion on which the photo sensor is disposed.

* * * * *